United States Patent [19]
McDonald et al.

[11] Patent Number: 6,091,549
[45] Date of Patent: Jul. 18, 2000

[54] METHOD AND APPARATUS FOR ADJUSTABLE SPHERICAL ABERRATION CORRECTION AND FOCUSING

[75] Inventors: Mark E. McDonald, Mountain View; Andrew J. Daiber, Palo Alto, both of Calif.

[73] Assignee: Siros Technologies, Inc., San Jose, Calif.

[21] Appl. No.: 09/059,868

[22] Filed: Apr. 14, 1998

[51] Int. Cl.[7] .............................. G02B 27/14; G02B 3/02
[52] U.S. Cl. ........................................... 359/637; 359/708
[58] Field of Search ................................... 359/637, 629, 359/708; 369/112

[56] References Cited

U.S. PATENT DOCUMENTS

| | | | |
|---|---|---|---|
| 5,097,464 | 3/1992 | Nishiuchi et al. | 369/112 |
| 5,105,408 | 4/1992 | Lee et al. | 369/44.15 |
| 5,125,750 | 6/1992 | Corle et al. | 359/819 |
| 5,157,555 | 10/1992 | Reno | 359/823 |
| 5,202,875 | 4/1993 | Rosen et al. | 369/94 |
| 5,235,581 | 8/1993 | Miyagawa et al. | 369/44.12 |
| 5,497,359 | 3/1996 | Mamin et al. | 369/44.15 |
| 5,610,901 | 3/1997 | Best et al. | 369/275.1 |
| 5,625,609 | 4/1997 | Latta et al. | 369/44.23 |
| 5,677,903 | 10/1997 | Holtslag et al. | 369/112 |
| 5,712,842 | 1/1998 | Yamamoto | 369/112 |
| 5,729,393 | 3/1998 | Lee et al. | 359/819 |
| 5,764,613 | 6/1998 | Yamamoto et al. | 369/112 |
| 5,835,283 | 11/1998 | Yamanaka | 359/719 |
| 5,923,480 | 7/1999 | Labeye | 359/814 |
| 5,995,292 | 11/1999 | McDonald | 359/637 |
| 6,016,301 | 1/2000 | Takasawa et al. | 369/112 |

FOREIGN PATENT DOCUMENTS

| | | | |
|---|---|---|---|
| 0727777 | 2/1996 | European Pat. Off. | G11B 7/12 |
| 8212579 | 8/1996 | Japan | G11B 7/135 |
| 8315404 | 11/1996 | Japan | G11B 7/135 |

OTHER PUBLICATIONS

Yamamoto, K., et al., .8 numerical aperture two element objective lens for the optical disk, Jpn., J. Appl. Phys. vol. 36, pp. 456–459, 1997.

Ichimura, I., et al., High–density optical recording using a solid immersion lens, Applied Optics, 36(19), pp. 4339–4348, 1997.

Kino, G., Near field optical storage, Optics & Photonics News, pp. 38–39, Nov. 1997.

Osato, K., et al., A rewritable optical disk system with over 10GB of capacity, Optical Data Storage, 1998 Tech. D. G. Ser. vol. 8, May 10–13, 1998, Conference Edition.

Hasegawa, K. et al., Extended capacity and high speed magnetic field modulation recording for 3.5 magnetooptical disk, IEEE Trans. J. Mag., 8(6), pp. 396–404, 1993.

Yamaguchi, S. et al., New flying optical head for high speed accessing, SPIE vol. 1248, 96–103, 1990.

*Primary Examiner*—Georgia Epps
*Assistant Examiner*—Saeed Seyrafi
*Attorney, Agent, or Firm*—Lumen Intellectual Property Services

[57] ABSTRACT

Two lenses separated by an air gap provide spherical aberration compensation and focusing of a light beam to a focal point inside a data storage medium. The thickness of the air gap determines the amount of spherical aberration compensation provided. The distance between the lens pair and storage medium determines the depth of the focal point within the storage medium. The internal surfaces of the lenses which define the air gap are preferably planar. The external surfaces of the lenses are aspheric to provide accurate focusing and positive spherical aberration. The air gap between the lenses may also be formed by curved internal surfaces, in which case it is best for the focus lens to have a concave internal surface. The apparatus and method of the present invention reduces the number of optical components required for an optical data reading/writing device.

16 Claims, 2 Drawing Sheets

METHOD AND APPARATUS FOR ADJUSTABLE SPHERICAL ABERRATION CORRECTION AND FOCUSING

FIELD OF THE INVENTION

This invention relates generally to the field of optical data storage, and in particular to a method and apparatus for correcting spherical aberration which occurs while reading or writing data in an optical storage medium.

BACKGROUND OF THE INVENTION

The use of compact disk (CD) data storage is well known in the art. CDs comprise a data layer residing beneath a clear coating layer having a well defined thickness. The data layer has marks of varying reflectance which are read by a laser beam focused on the data layer. The laser beam must be focused to a spot of minimal size in order for the system to achieve maximum data density, which is desired.

In order for the reading laser beam to be focused to a spot of minimal size, the optical system which focuses the laser beam must be designed to compensate for the distorting effects of spherical aberration. Spherical aberration has the effect of enlarging the focused spot size, which precludes achieving maximum data density.

The amount of spherical aberration varies with the thickness of the clear coating layer. For CDs having a single data layer and a clear coating of a known thickness, a lens assembly can be designed to compensate for the well defined magnitude of spherical aberration present. An optical focusing system designed for a first disk having a given clear coating thickness, however, cannot necessarily be used on a second disk having a different clear coating thickness.

It is expected that future optical data storage systems may use optical disks that have multiple data layers located at different depths. Such a system will require an adjustable spherical aberration compensation capability. The amount of spherical aberration compensation provided will need to be different for each data layer. More generally, spherical aberration requires correction in any system which must focus light to a minimal spot size at various depths within a medium. Such systems are not limited to current optical data storage systems.

U.S. Pat. No. 5,202,875 to Rosen et al. discloses an optical data storage system having multiple data layers. Different embodiments of the data storage system employ different methods for providing spherical aberration correction. In one embodiment, stepped plates are disposed between an objective lens and a CD. The stepped plates have different thicknesses and are moved in and out of the optical path such that light always passes through the same thickness of material (clear coating material) before hitting the data layer. Paired wedges and rotatable stepped wedges also perform the same function.

In another embodiment, Rosen describes an aberration compensation technique involving the use of two lenses (a convex lens and a concave lens) in addition to the objective lens assembly. The lenses are moved relative to one another to provide controlled spherical aberration correction. The distance between the lenses determines the magnitude of aberration correction. An inherent requirement of this technique is that the spherical aberration compensation lenses must be used in conjunction with an objective lens head which provides focusing. U.S. Pat. No. 5,610,901 to Best et al. discloses a similar spherical aberration compensation technique.

U.S. Pat. No. 5,157,555 to Reno discloses a spherical aberration correction apparatus which uses two lenses having an adjustable air gap between them. The lenses are convex and concave, with complementary surfaces facing each other. Reno's apparatus is used in conjunction with an optical head for focusing a beam onto the data surface. The focusing and spherical aberration compensation lenses are separate components. This increases the number of optical elements required in the total system, thus increasing system complexity.

It would be a significant advance in the art of optical data storage to provide an aberration correction system which requires fewer optical components while providing adjustable spherical aberration correction.

SUMMARY

Briefly, and in general terms, the present invention provides a method and apparatus for adjustable spherical aberration correction and adjustable focusing of a light beam. The capability for simultaneous adjustable aberration compensation and adjustable focusing is attained by using a pair of lenses, with at least one of the lenses having an aspheric external surface which provides for focusing of the light beam. In a preferred embodiment, both of the lenses have aspheric external surfaces. The lenses are positioned such that their internal surfaces face each other and define an air gap between them. An actuator is provided for varying the thickness of the air gap between the lenses. The thickness of the air gap determines the amount of spherical aberration compensation provided.

The present invention also provides a method for focusing a light beam into a data storage medium and for correcting spherical aberration. Briefly, and in general terms, the method includes the step of providing a pair of aspheric lenses having an air gap defined by opposed internal surfaces of the lenses. The thickness of the air gap between the lenses is adjusted in accordance with the depth of the focal point within the storage medium. According to the method, when the depth of the focal point within the medium is changed, the thickness of the air gap is adjusted to reduce spherical aberration. The depth of focus provided by the lenses is changed by moving both lenses toward or away from the storage medium. The air gap thickness is adjusted to vary the spherical aberration compensation as the focus depth changes.

In the preferred embodiment, by way of example and not necessarily by way of limitation, the data storage medium has data stored at a plurality of data layers which are located at different depths inside the medium. Preferably, an actuator is provided to control the air gap thickness during focus depth changes. The internal surfaces of the lenses are preferably planar. In addition, both lenses preferably have positive spherical aberration. The external surface of the lens positioned closer to the data storage medium preferably has a longer radius of curvature than the external surface of the lens positioned further from the data storage medium.

DETAILED DESCRIPTION

Figure 1:
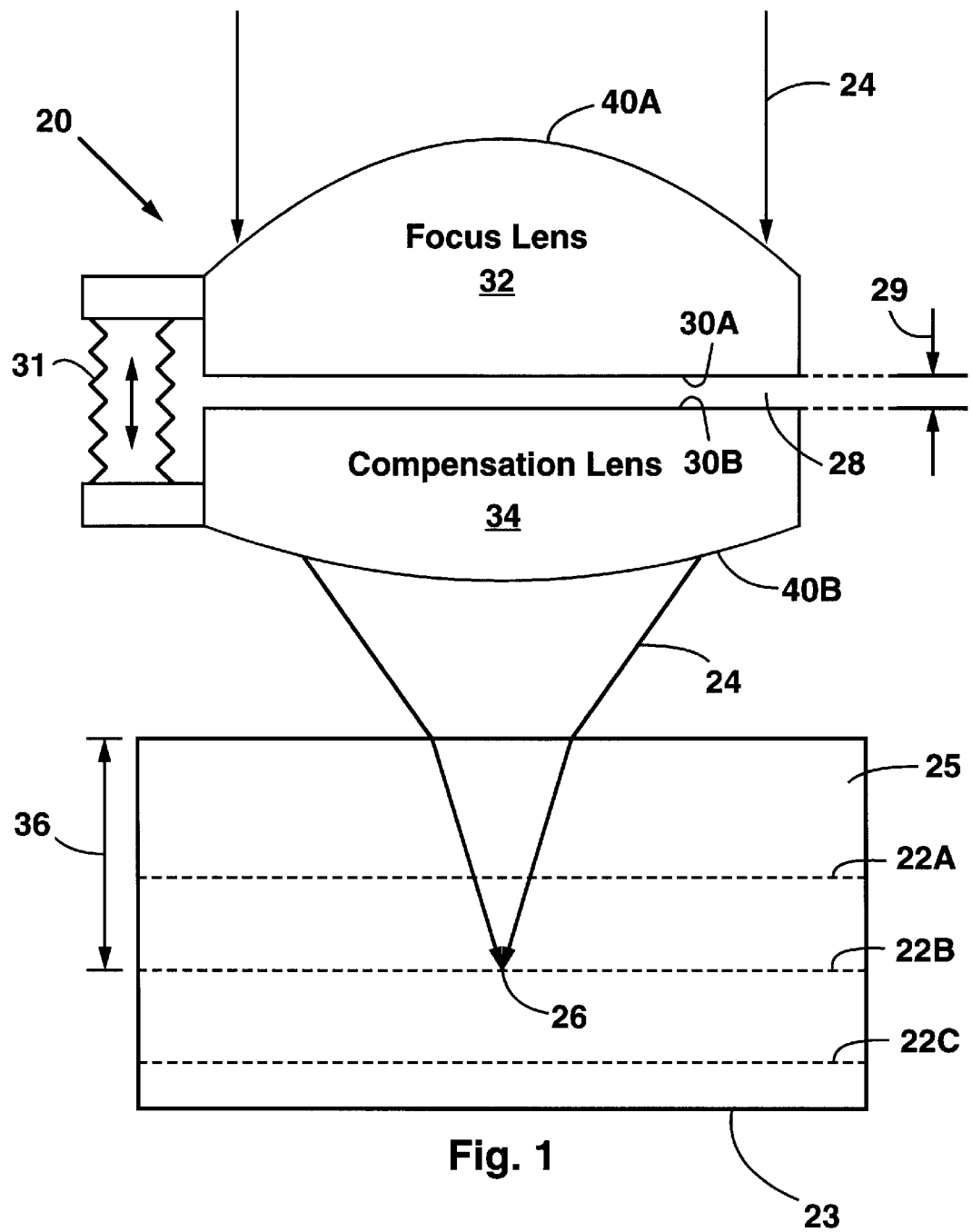
FIG. 1 shows a lens pair for focusing a light beam into a data storage medium and for providing spherical aberration compensation according to a preferred embodiment of the invention.

FIG. 1 shows a preferred embodiment of an apparatus for focusing a light beam into a data storage medium and for providing spherical aberration compensation. The apparatus includes a lens pair 20 positioned above a data storage medium 23. The storage medium 23 preferably includes a cover plate 25 comprising standard optical glass, such as BK7 material. The storage medium 23 also preferably has within it multiple data layers, as illustrated by data layers 22A, 22B, and 22C. Although the data storage medium is shown with three data layers in the embodiment of FIG. 1, it is to be understood that the method and apparatus of the present invention may be used with data storage media having any number of data layers.

A collimated laser beam 24 from a laser (not shown) is focused by the lens pair 20 to a focal point 26 which is coincident with the middle data layer 22B. Preferably, the laser beam 24 is collimated, but the apparatus of the present invention can also operate with noncollimated laser beams. Laser light reflected from the data layer 22B is collected by the lens pair 20 and sent to a detector (not shown) which reads the data encoded in the data layer 22B, as is well known in the art of optical data recording and reading.

The lens pair 20 includes a focus lens 32 and a compensation lens 34. The focus lens 32 is positioned further from the data storage medium 23 than the compensation lens 34. Preferably, the focus lens 32 has a shorter focal length than the compensation lens 34. It is also preferable for both lenses 32, 34 to have positive spherical aberration. At least one and preferably both external surfaces 40A, 40B of the lenses are aspheric and are designed to provide accurate focusing of the light beam 24.

The lenses 32, 34 are positioned such that an air gap 28 exists between their internal surfaces 30A, 30B. Preferably, the internal surfaces 30A, 30B of the lenses are planar and planar parallel such that the air gap 28 is planar. The internal surfaces 30A, 30B are also preferably polished and accurately flat so that the lenses 32, 34 can be brought into intimate contact. The use of planar internal surfaces facilitates inexpensive manufacturing of the lenses 32, 34. The use of planar internal surfaces also facilitates the accurate alignment of the lenses 32, 34 with respect to each other. Air gap thickness 28 determines the amount of positive spherical aberration imparted on the light beam 24 by the lens pair 20.

Focusing of the laser beam 24 at different data layers 22A, 22B, 22C is accomplished by moving both lenses 32, 34 with respect to the storage medium 23. Moving the lenses 32, 34 away from the storage medium, for example, can cause the focal point 26 to be coincident with the shallowest data layer 22A.

The amount of spherical aberration compensation required for the laser beam 24 depends upon the depth 36 of the focal point 26 within the storage medium 23. Therefore, as the focal point 26 is moved in depth 36, the required amount of spherical aberration compensation changes.

The spherical aberration compensation provided by the lens pair 20 is determined by the air gap thickness 29. Therefore, the air gap thickness 29 can be controlled such that the positive spherical aberration of the lens pair 20 exactly compensates for the negative spherical aberration of the storage medium thickness 36. Generally, a deeper focal point 26 requires a thinner air gap 29. For example, as the lens pair 20 is moved away from the storage medium 23 to access a more shallow data layer 22A, the air gap thickness 29 should be increased to maintain tight focusing at the new focal point. It is preferable to design the lens pair 20 and data storage medium 23 such that the lenses 32, 34 are in contact (to within a tolerance of about 100 microns) when reading data from the deepest data layer 22C.

The air gap thickness 29 can be controlled with a voice coil motor 31 or similar actuator which accurately positions the lenses 32, 34. Similarly, the position of the lens pair 20 with respect to the storage medium 23 can be controlled with another voice coil motor (not shown), as is well known in the art of CD-ROM drive construction.

It is noted that varying the air gap thickness 29 may have an effect upon the focus depth 36. Also, varying the distance from the lens pair 20 to the storage medium 23 may have an effect upon the spherical aberration. The focus and spherical aberration correction adjustments will not necessarily be decoupled. Therefore, it is preferable for the adjustments to the lens position and the air gap thickness to be independently controllable.

The lens pair 20 can be controlled with an actuator mechanism which positions the lens pair 20 and adjusts the air gap thickness 29 according to predetermined settings. The predetermined settings are designed to provide proper focusing and aberration compensation for each data layer 22A, 22B, 22C within the storage medium 23. Such 'open loop' actuator systems are well known in the art.

It is preferable for the lens pair to be designed such that the external surface 40A of the focus lens 32 has a shorter base radius of curvature (hence shorter focal length) than the external surface 40B of the compensation lens 34. This is because the design tolerances of the lenses 32, 34 are much more stringent if the compensation lens 34 has a shorter curvature radius. However, an embodiment in which the compensation lens 34 has a shorter curvature radius is well within the scope of the present invention.

The external surfaces 40A, 40B of the lenses 32, 34 are preferably aspherical. It is also preferable that both external surfaces 40A, 40B have a positive spherical aberration. In other words, the surfaces 40A, 40B preferably have a curvature which is greater around the periphery than at the center. This results in the lens pair 20 having a net positive spherical aberration which offsets the negative spherical aberration which arises when the focal point 26 is within the storage medium 23. It is noted that one of the lenses 32, 34 can have a negative spherical aberration if it is more than offset by the positive spherical aberration of the other lens. However, this is not preferred because it requires lens surfaces 40A, 40B to have a higher precision for the same performance.

The use of aspheric lenses as precision objective lenses is well known in the art of optics. For more information concerning aspheric lens design, reference can be made to *Modern Lens Design: A Resource Manual*, by Warren J. Smith, McGraw-Hill, N.Y., 1992. In a specific embodiment of the present invention, the aspheric external surfaces 40A, 40B have shapes in accordance with the following equation:

$$z = c\rho^2/(1+(1-c^2\rho^2-\kappa c^2\rho^2)^{1/2}) + A\rho^4 + B\rho^6 + C\rho^8 + D\rho^{10}$$

where z is the deviation from a plane, $\rho$ is the radius on the lens, c is the base spherical curvature, $\kappa$ is the conic coefficient of the surface, and A, B, C, and D are the aspheric coefficients.

In a specific embodiment of the present invention, the internal surfaces 30A, 30B of the lenses are planar, the lens pair operates at a numerical aperture of 0.5, and the focal lens external surface 40A is defined according to the above equation with the following values:

c=(1/2.983801) mm$^{-1}$;

κ=−0.6523989;
A=0.00043011485 mm$^{-3}$;
B=−4.8039255×10$^{-5}$ mm$^{-5}$;
C=−1.6873236×10$^{-6}$ mm$^{-7}$; and
D=9.62201227×10$^{-9}$ mm$^{-9}$.

Also in this specific embodiment, the compensation lens external surface 40B is defined according to the above equation with the following values:
c=(1/−17.14146) mm$^{-1}$;
κ=28.15025;
A=−0.0013322858 mm$^{-3}$;
B=0.00097697467 mm$^{-5}$;
C=−0.00021003262 mm$^{-7}$; and
D=1.9828155×10$^{-5}$ mm$^{-8}$.

Also in this specific embodiment, the lens pair 20 and the data storage medium 23 have additional parameters with values as follows:
refractive index of the focus lens=1.605;
refractive index of the compensation lens=1.605;
refractive index of the data storage=1.530;
refractive index of the cover plate=1.520;
thickness of the cover plate=1.2 mm;
depth of data layer 22A below the cover plate=0.0 mm;
depth of data layer 22B below the cover plate=0.533 mm;
depth of data layer 22C below the cover plate=1.066 mm; and
wavelength of the laser beam=0.532 μm.

Figure 2:
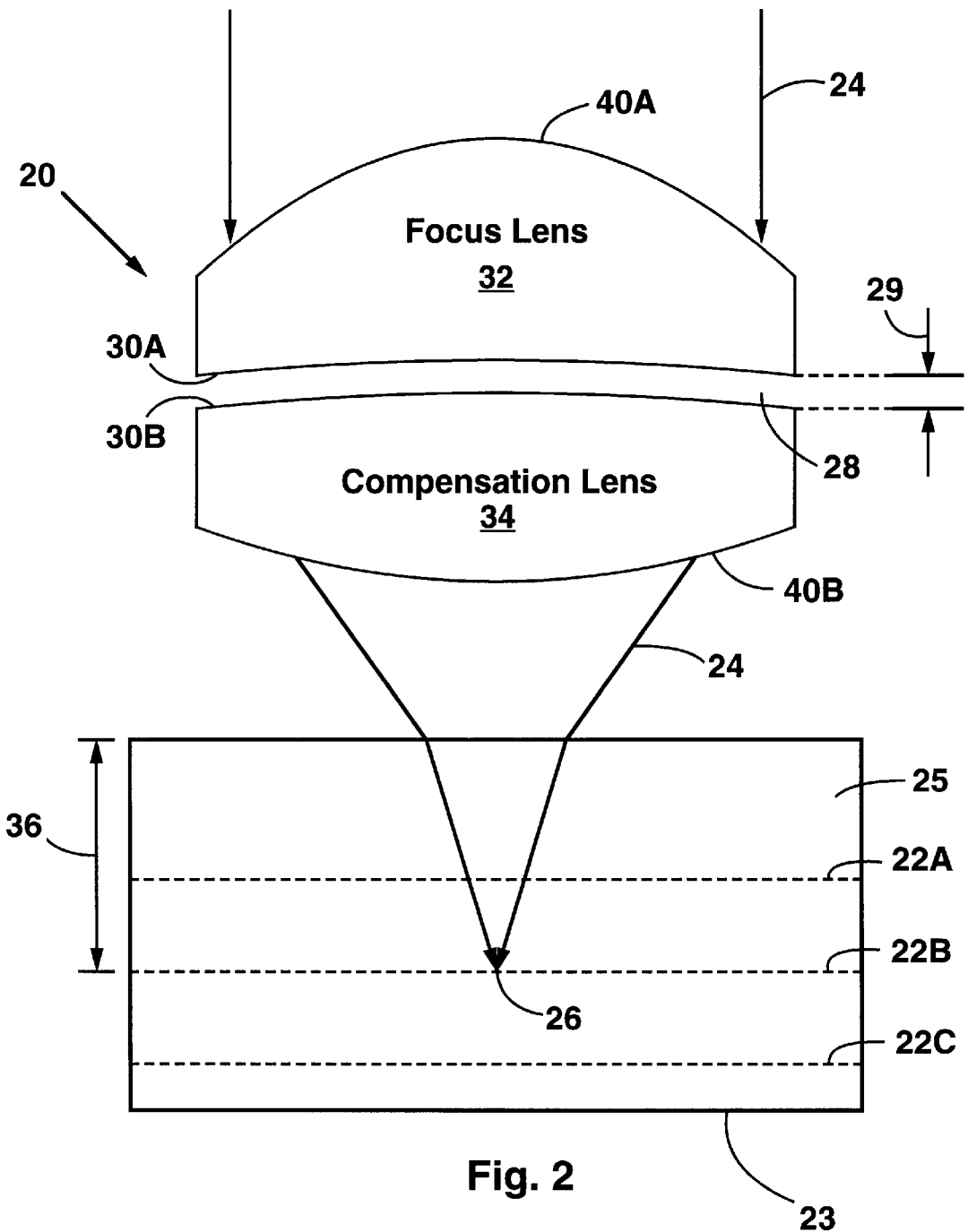
FIG. 2 shows a lens pair for focusing a light beam into a data storage medium and for providing spherical aberration compensation according to a second embodiment of the invention.

FIG. 2 shows an alternative embodiment of the spherical aberration correction apparatus which uses curved internal surfaces 30A, 30B of the lenses 32,34. If the lenses have curved internal surfaces 30A, 30B, it is best for the internal surfaces to have accurately complementary shapes so that they can be brought into intimate contact with each other. It is also best for the internal surface 30A of the focus lens 32 to be concave and for the internal surface 30B of the compensation lens 34 to be convex, as shown in FIG. 2. This arrangement is preferred because it minimizes the variation of numerical aperture as the air gap thickness 29 is adjusted.

If the internal surfaces 30A, 30B are curved, the internal surface shapes can be spherical or aspherical. Preferably, the shapes of surfaces 30A, 30B are complementary such that the surfaces can be brought into intimate contact over their entire area.

A distinguishing feature of the apparatus of the present invention is that it can perform both focusing and aberration compensation, thereby reducing the total number of optical components required.

It is to be noted that the design parameters listed above represent one possible embodiment of the invention and are not intended to limit the scope of the invention. The actual design parameters of the apparatus will depend greatly upon the particular application at hand. The shapes of the lenses 32, 34, air gap thickness 29, range of motion for the lenses 32, 34, and range of thicknesses for the air gap will depend, for example, on the structure of the storage medium 23, the distance between data layers, and the nature of the laser beam 24. However, it will be apparent to one skilled in the art of optical system design how to construct the spherical aberration compensating and focusing system based upon the foregoing description.

It will also be clear to one skilled in the art that the above embodiments may be altered in many ways without departing from the scope of the invention. Accordingly, the scope of the invention should be determined by the following claims and their legal equivalents.

What is claimed is:

1. An apparatus for focusing a light beam into a data storage medium and for providing spherical aberration compensation, the apparatus comprising a pair of lenses, wherein at least one of the lenses has an aspheric external surface for focusing the light beam, and wherein the lenses are positioned such that their internal surfaces face each other and such that a gap exists between the internal surfaces, the gap having a thickness which determines the amount of spherical aberration compensation provided by the pair of lenses, the internal surfaces having complementary shapes and each of the lenses having an aspheric external surface.

2. An apparatus for focusing a light beam into a data storage medium and for providing spherical aberration compensation, the apparatus comprising a pair of lenses, wherein at least one of the lenses has an aspheric external surface for focusing the light beam, and wherein the lenses are positioned such that their internal surfaces face each other and such that a gap exists between the internal surfaces, the gap having a thickness which determines the amount of spherical aberration compensation provided by the pair of lenses, the internal surfaces having complementary shapes, and the pair of lenses comprising a focus lens and a compensation lens, the external surface of the focus lens having a shorter radius of curvature than the external surface of the compensation lens.

3. The apparatus of claim 2, wherein the internal surface of the focus lens has a concave shape and the internal surface of the compensating lens has a convex shape.

4. The apparatus of claim 2, further comprising an actuator for varying the thickness of the gap.

5. An apparatus for focusing a light beam into a data storage medium having data layers therein and for providing spherical aberration compensation, the apparatus comprising a pair of lenses, wherein at least one of the lenses has an aspheric external surface for focusing the light beam, and wherein the lenses are positioned such that their internal surfaces face each other and such that a gap exists between the internal surfaces, the internal surfaces having complementary shapes and the gap having a thickness which determines the amount of spherical aberration compensation provided by the pair of lenses, the gap ranging from 0 to 100 microns when the light beam is focused to a deepest of the data layers.

6. The apparatus of claim 5, wherein each of the lenses has an aspheric external surface.

7. The apparatus of claim 6, wherein the internal surfaces are selected from the group consisting of planar surfaces, curved surfaces and spherical surfaces.

8. The apparatus of claim 5, wherein the internal surfaces are selected from the group consisting of planar surfaces, curved surfaces and spherical surfaces.

9. The apparatus of claim 5, wherein said pair of lenses comprises a focus lens and a compensation lens.

10. The apparatus of claim 9, wherein the internal surface of the focus lens has a concave shape and the internal surface of the compensation lens has a convex shape.

11. The apparatus of claim 9, wherein the external surface of the focus lens has a shorter radius of curvature than the external surface of the compensation lens.

12. The apparatus of claim 5, wherein at least one of the lenses has positive spherical aberration.

13. The apparatus of claim 12, wherein both lenses have positive spherical aberration.

14. The apparatus of claim 5, further comprising an actuator for varying the thickness of the gap.

15. A method for focusing a light beam into a data storage medium and for correcting spherical aberration, the method comprising the steps of:
   a) providing a pair of aspheric lenses having a gap defined by opposed internal surfaces of the lenses, the opposed internal surfaces having complementary shapes and each of the lenses having an aspheric external surface;
   b) positioning the pair of lenses to focus the light beam into the storage medium at a first focus depth within the storage medium;
   c) adjusting the thickness of the gap between the lenses such that spherical aberration is reduced for the first depth;
   d) positioning the pair of lenses to focus the light beam into the storage medium at a second focus depth within the storage medium; and
   e) readjusting the thickness of the gap between the lenses such that spherical aberration is reduced for the second depth.

16. The method of claim 15, wherein the data storage medium includes a plurality of data layers located at different depths within the medium, and wherein a first one of the data layers is located at the first focus depth and a second one of the data layers is located at the second focus depth.

* * * * *